United States Patent
Yuan et al.

(10) Patent No.: US 11,109,276 B2
(45) Date of Patent: *Aug. 31, 2021

(54) ESTABLISHING A LOW BITRATE COMMUNICATION SESSION WITH A HIGH BITRATE COMMUNICATION DEVICE

(71) Applicant: Verizon Patent and Licensing Inc., Arlington, VA (US)

(72) Inventors: Jun Yuan, Cranbury, NJ (US); Xin Wang, Morris Plains, NJ (US); Nanjun Qian, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/690,412

(22) Filed: Nov. 21, 2019

(65) Prior Publication Data

US 2020/0092755 A1     Mar. 19, 2020

Related U.S. Application Data

(63) Continuation of application No. 15/999,023, filed on Aug. 20, 2018, now Pat. No. 10,492,105.

(51) Int. Cl.
| | |
|---|---|
| *H04L 12/26* | (2006.01) |
| *H04W 28/22* | (2009.01) |
| *H04W 36/26* | (2009.01) |
| *H04L 1/00* | (2006.01) |
| *H04W 72/08* | (2009.01) |
| *H04W 80/02* | (2009.01) |
| *H04B 17/309* | (2015.01) |
| *H04L 29/06* | (2006.01) |

(52) U.S. Cl.
CPC .......... *H04W 28/22* (2013.01); *H04B 17/309* (2015.01); *H04L 1/0002* (2013.01); *H04L 65/602* (2013.01); *H04W 36/26* (2013.01); *H04W 72/08* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 8,880,126 B2 | 11/2014 | Fu et al. | |
| 10,492,105 B1* | 11/2019 | Yuan | ............. H04W 28/22 |
| 2007/0091848 A1* | 4/2007 | Karia | ............. H04L 29/125 |
| | | | 370/331 |
| 2008/0119165 A1* | 5/2008 | Mittal | ............. H04L 63/029 |
| | | | 455/411 |

(Continued)

*Primary Examiner* — Phuongchau Ba Nguyen (57) ABSTRACT

An example method includes receiving, from a high bitrate communication device, a first request to communicate via a high bitrate communication protocol; responding to the first request from the high bitrate communication device by establishing a high bitrate communication session; sending, after the high bitrate communication session is established, a second request to the high bitrate communication device to communicate via a low bitrate communication protocol; receiving, from the high bitrate communication device, a response associated with the second request; and establishing a low bitrate communication session using the low bitrate communication protocol.

20 Claims, 5 Drawing Sheets

(56) References Cited

U.S. PATENT DOCUMENTS

| | | |
|---|---|---|
| 2010/0255831 A1* | 10/2010 | Shuman .............. H04M 7/0084 |
| | | 455/423 |
| 2014/0314022 A1 | 10/2014 | Rathnam et al. |
| 2016/0066221 A1 | 3/2016 | Sapkota et al. |
| 2016/0112471 A1 | 4/2016 | Ezell et al. |
| 2017/0232335 A1* | 8/2017 | Williams ................ A63F 13/50 |
| | | 463/31 |
| 2018/0014168 A1* | 1/2018 | Lau ......................... H04W 4/14 |
| 2018/0063764 A1 | 3/2018 | Bollapalli et al. |
| 2020/0022059 A1* | 1/2020 | Kamei .................. H04L 45/122 |

\* cited by examiner

ESTABLISHING A LOW BITRATE COMMUNICATION SESSION WITH A HIGH BITRATE COMMUNICATION DEVICE

RELATED APPLICATION

This application is a continuation of U.S. patent application Ser. No. 15/999,023, filed Aug. 20, 2018 (now U.S. Pat. No. 10,492,105), which is incorporated herein by reference.

BACKGROUND

Low bitrate communication devices may provide connectivity to a network or other devices at low cost, low power, and/or low resource consumption. Some low bitrate communication devices include wearable devices, smart home devices, Internet of Things (IoT) devices, and/or the like. Low bitrate communication devices may wirelessly communicate with other devices (e.g., other low bitrate communication devices and/or high bitrate communication devices) via short-range communication protocols (e.g., BLUETOOTH®, near field communication (NFC), and/or the like) and/or via network communication protocols (e.g., Wi-Fi, cellular communication, and/or the like).

DETAILED DESCRIPTION OF PREFERRED EMBODIMENTS

The following detailed description of example implementations refers to the accompanying drawings. The same reference numbers in different drawings may identify the same or similar elements.

In many instances, a low bitrate communication device enables enhanced connectivity capabilities for users. For example, users may use a low bitrate communication device, such as a wearable device (e.g., a smart watch, a fitness tracker, a health monitor, a pair of smart eyeglasses, and/or the like), a smart home device (e.g., home assistant device, a home monitoring device, and/or the like), or an Internet of Things (IoT) device (e.g., a Cat-M1device, a narrowband (NB) IoT device, an enhanced machine type communication (eMTC) device, and/or the like), to communicate with another device. In some cases, the low bitrate communication device may support voice calling service. For example, a user may use an IoT device to have a conversation over a cellular network with another user without the user needing a mobile phone.

However, a low bitrate communication device may have a single receiving antenna and relatively low antenna efficiency (e.g., due to the low bitrate communication device being configured to be a compact, low cost, and/or low power device). Accordingly, it may be desirable that the low bitrate communication device use a low bitrate and/or low bandwidth communication protocol or codec for a voice call to ensure high voice quality and/or acceptable voice quality under poor radio conditions (e.g., poor conditions at edges of cells, poor conditions in high interference locations, and/or the like). In some cases, for a voice call between the low bitrate communication device and a high bitrate communication device (e.g., a mobile phone), a communication session for the voice call may be configured for the high bitrate communication device (e.g., because the high bitrate communication device initiated the voice call) in that the communication session is configured to use a high bitrate communication protocol. In such cases, the low bitrate communication device may be unable to decode, receive, and/or keep up with the high bitrate and corresponding high amount of voice data provided from the high bitrate communication device because of the configured high bitrate. In such cases, the low bitrate communication device may need to drop packets and/or drop the voice call, resulting in a degraded user experience and/or waste of network and processing resources. But, when receiving voice calls from the high bitrate communication device, it may be desirable that the low bitrate communication device accept and/or establish the voice call as quickly as possible to avoid any delay that may degrade the user experience.

Some implementations described herein enable a low bitrate communication device to configure a low bitrate communication session with a high bitrate communication device to provide enhanced performance (e.g., decreased packet loss, decreased call drops, and/or the like) and an enhanced user experience. As described herein, the low bitrate communication device and high bitrate communication device may establish a communication to exchange (e.g., transmit and/or receive) data. For example, the low bitrate communication device may receive an invite to exchange voice data for a voice call (which may be referred to herein as an invite to "hold" the voice call). The low bitrate communication device may accept or establish a high bitrate communication session for the voice call based on the receiving the invite (e.g., to establish a connection between the high bitrate communication device and low bitrate communication device without delay). After the high bitrate communication session is established, the low bitrate communication device may re-invite the high bitrate communication device to hold a low bitrate communication session for the voice call.

Accordingly, a high bitrate communication session for the voice call can be initiated upon receipt of the invite to hold the voice call, and a communication protocol for holding the call can be reconfigured, by the low bitrate communication device, using a low bitrate communication session to improve a quality of the voice call (e.g., by reducing packet loss and/or likelihood of dropping the voice call) relative to using the high bitrate communication session. In some implementations, the low bitrate communication device may perform speech frame bundling within packets associated with the voice call. The speech frame bundling may improve the quality of the voice call when the low bitrate communication device is in a poor coverage area and/or experiencing poor call conditions. For speech frame bundling, the low bitrate communication device may increase a size of packets that include the voice data for the voice call (e.g., to compensate for a half-duplexed low bitrate communication device). As such, uplink and downlink switching may be reduced which enables increased scheduling efficiency and better coverage for the voice call.

Accordingly, some implementations described herein may conserve networking and/or computing resources (e.g., processor resources, memory resources, power resources and/or the like) by decreasing a packet loss rate and a dropped communication session rate (or dropped call rate when a communication session is for a voice call). Decreasing the packet loss rate and/or the dropped communication session rate, using the techniques disclosed herein, may avoid wasting networking resources that would be used to transmit packets or data from dropped communication sessions (e.g., voice data from dropped calls). Furthermore, decreasing the packet loss rate and/or the dropped communication session rate, using the techniques disclosed herein, may avoid wasting computing resources because the low bitrate communication device spends processing resources, memory resources, and power resources attempting to receive dropped packets and/or ultimately dropping or attempting to recover from a dropped communication session.

Figure 1:
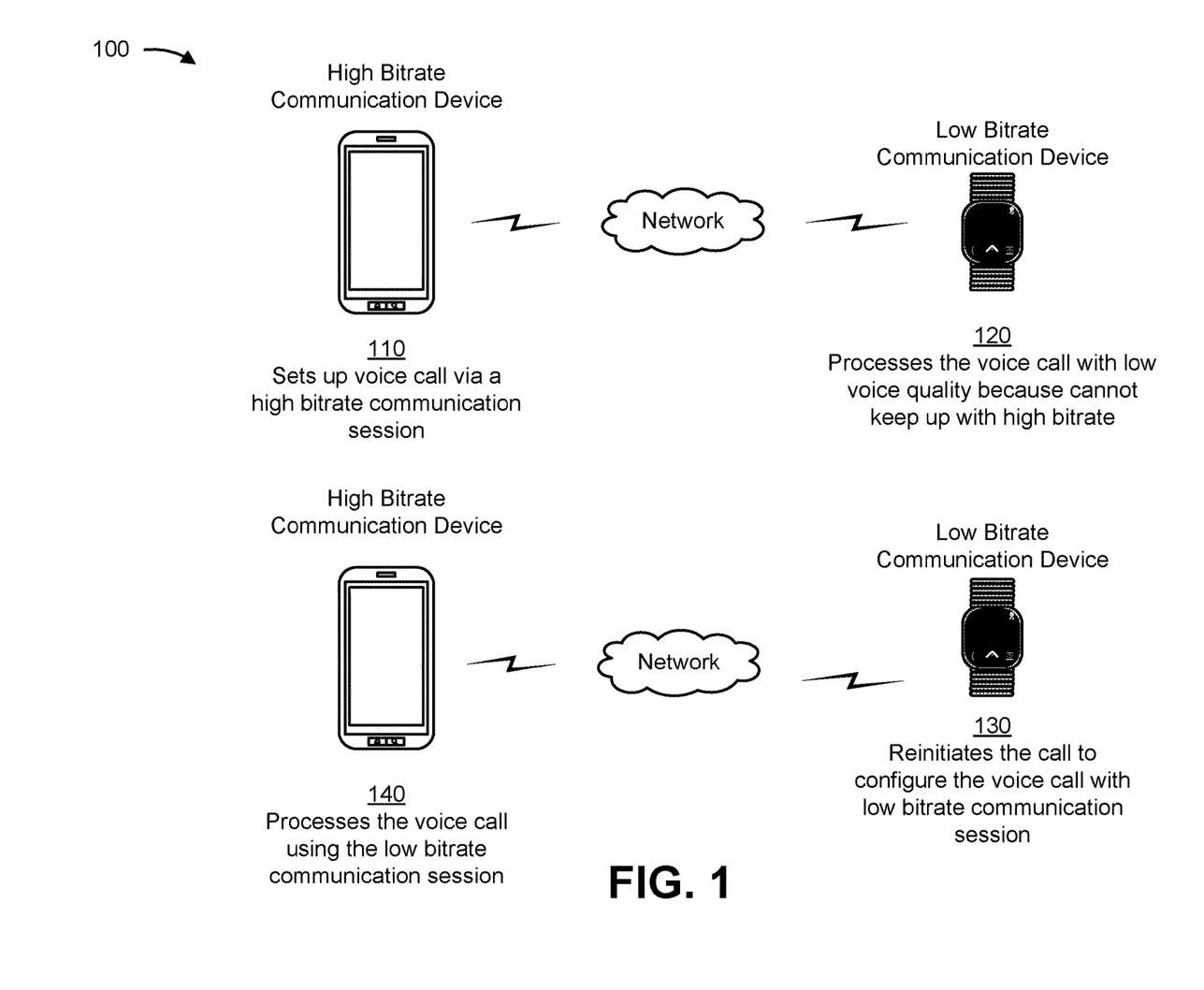
FIG. 1 is a diagram of an example implementation described herein.

FIG. 1 is a diagram of an example implementation 100 described herein. As shown in FIG. 1, a high bitrate communication device (shown as a smartphone) communicates with a low bitrate communication device (shown as a smart watch) via a communication session via a network (e.g., a wireless communication network or wired communication network). In some instances, the low bitrate communication device may include another type of wearable device (e.g., a fitness tracker, a health monitor, a pair of smart eyeglasses, and/or the like), a smart home device (e.g., home assistant device, a home monitoring device, and/or the like), an Internet of Things (IoT) device (e.g., a Cat-M1device, a narrowband (NB) IoT device, an enhanced machine type communication (eMTC) device, and/or the like), and/or the like. As used herein, the communication session may include both a high bitrate communication session and a low bitrate communication session. In example implementation 100, the low bitrate communication device establishes a low bitrate communication session with the high bitrate communication device to enhance a quality (e.g., a voice quality, a data quality, and/or the like) of the communication between the high bitrate communication device and the low bitrate communication device.

As shown in FIG. 1, and by reference number 110, the high bitrate communication device sets up a voice call with the low bitrate communication device via a high bitrate communication session. For example, the high bitrate communication device may send a session initiation protocol (SIP) invite to the low bitrate communication device with an offer (e.g., a session description protocol (SDP) offer) to hold the voice call according to one or more high bitrate communication protocols. In FIG. 1, the high bitrate communication device and low bitrate communication device are in communication with a same cellular network. Accordingly, the high bitrate communication device may send the SIP invite over the cellular network to the low bitrate communication device. The low bitrate communication device may exchange a set of messages (e.g., acknowledgements, responses, and/or the like) to set up a high bitrate voice call.

As shown in FIG. 1, and by reference number 120, the low bitrate communication device processes the voice call with low voice quality because the low bitrate communication device cannot keep up with the high bitrate. For example, the high bitrate may be 12 kilobits per second (kbps) or faster, but the low bitrate communication device may be configured to operate at a bitrate of 7.5 kbps or slower. As such, the low bitrate communication device may not be able to process the voice data for the voice call that is received in packets at the high bitrate and may need to drop packets to attempt keep up with the high bitrate. Additionally, or alternatively, a network (e.g., a cellular network of the low bitrate communication device and the high bitrate communication device) may not be able to serve the voice call at the high bitrate (e.g., due to poor radio conditions of the low bitrate communication device and/or network). In some cases, the low bitrate communication device may need to drop the voice call, resulting in a degraded user experience and a waste of networking and computing resources.

As shown in FIG. 1, and by reference number 130, to avoid the high packet loss rate and/or likelihood of dropping the call, the low bitrate communication device may update the voice call with a low bitrate communication session. For example, after the high bitrate communication session is established, the low bitrate communication device may send an SIP re-invite to the high bitrate communication device with an offer to establish the low bitrate communication session. In some implementations, the low bitrate communication device may send the SIP re-invite within a threshold time period (e.g., less than 20 milliseconds (ms), less than 50 ms, and/or the like) and/or may send the SIP re-invite as a next message after the high bitrate communication session is established with the high bitrate communication device. Accordingly, the time period during which the low bitrate communication device is to process voice data for the voice call using the high bitrate communication session may be relatively short. As such, any packet loss that may occur while the low bitrate communication device is communicating with the high bitrate communication device via the high bitrate communication session may be unnoticeable to a user of the low bitrate communication device and/or high bitrate communication device because of the relatively short time period.

In some implementations, the low bitrate communication device may send the SIP re-invite based on one or more characteristics. For example, the low bitrate communication device may send the SIP re-invite based on a characteristic of the high bitrate communication session (e.g., whether the high bitrate communication session is for a voice call or other type of communication, whether the high bitrate communication session is established during a particular time of day, if the high bitrate communication session is experiencing a threshold packet loss rate, and/or the like). Accordingly, the low bitrate communication device may attempt to reconfigure the high bitrate communication session to the low bitrate communication session based on one or more characteristics of the high bitrate communication session and/or low bitrate communication device.

As further shown in FIG. 1, and by reference number 140, the high bitrate communication device processes the voice call using the low bitrate communication session. For example, based on receiving the SIP re-invite, which may include an offer to communicate via one or more low bitrate communication protocols and/or configurations (e.g., enhanced voice service (EVS) at 5.9 kbps, an EVS at 7.2 kbps, an adaptive multi-rate wideband (AMR-WB) at 6.6 kbps, an AMR at 5.9 kbps, and/or the like) used by the low bitrate communication device, the high bitrate communication device may establish the low bitrate communication session with the low bitrate communication device. In such cases, the high bitrate communication device may be configured to provide a voice call quality that corresponds to the voice call quality of the low bitrate communication device. As such, the user of the high bitrate communication device and/or the user of the low bitrate communication device may receive enhanced voice quality relative to using a high bitrate communication protocol for the voice call because both the low bitrate communication device and high bitrate communication device are capable of decoding voice data via a low bitrate communication protocol (whereas the low bitrate communication device is not capable of decoding voice data via the high bitrate communication protocol).

In some implementations, using the low bitrate communication session, the low bitrate communication device may monitor the voice quality of the voice call. For example, the low bitrate communication device may monitor indicators of the voice quality such as packet loss rate, reference signal receive power (RSRP), signal to interference plus noise ratio (SINR), and/or the like. In such cases, the low bitrate communication device may be in a low coverage area, such as at an edge of a cell of the cellular network, in an area of a cell that experiences a relatively high amount of interference (e.g., within or near a building or structure), and/or the like. The low bitrate communication device may determine whether one or more of the indicators corresponding to a voice quality condition satisfy a threshold voice quality. If the voice quality condition does not satisfy the threshold voice quality (e.g., the low bitrate communication device is experiencing a relatively high packet loss rate, a relatively low signal received power (RSRP), a relatively low signal to interference plus noise ratio (SINR), and/or the like), the low bitrate communication device may perform speech bundling to enhance the coverage and increase the voice quality for the voice call. Accordingly, if a packet loss rate of the low bitrate communication session does not satisfy a threshold packet loss rate, a RSRP of the low bitrate communication session does not satisfy a threshold RSRP, or a SINR of the low bitrate communication session does not satisfy a threshold SINR, the low bitrate communication device may perform speech frame bundling, as descried herein.

According to some implementations described herein, the low bitrate communication device may perform speech bundling by aggregating multiple vocoder frames from the voice call into a single packet (e.g., a real-time transport protocol (RTP) packet) that includes the voice data. In some implementations, the low bitrate communication device may increase the packet size of packets transmitted via the low bitrate communication session to perform the speech frame bundling. For example, if a standard packet size (e.g., which may be used during acceptable or high voice quality conditions) is 20 ms, the low bitrate communication device may increase the packet size to 40 ms, 60 ms, 80 ms, and/or the like. The increase in packet size may compensate for a low bitrate communication device that is half-duplexed (e.g., that allows communication in both directions but not in both directions simultaneously). As such, reducing the frequency of switching between uplink and downlink transmissions may enable more efficient scheduling and enhance the voice quality of the voice call using the low bitrate communication session.

As a specific example, for two speech frame bundling (two speech frames are bundled into a single packet), 32 repetitions of the speech frames are possible on the uplink with 40 ms packet size. However, without speech frame bundling, 16 repetitions of the speech frames on the uplink may not be possible within the 20 ms schedule. Accordingly, combining the speech frame bundling and using the low bitrate communication session (which allows up to 32 repetitions for a downlink/uplink data channel), the low bitrate communication device may send voice data (within the RTP packets) more reliably and provide enhanced voice quality. Furthermore, speech frame bundling may reduce overhead of the communication protocol, thus conserving network and/or computing resources.

Accordingly, the low bitrate communication device may configure a low bitrate communication session with high bitrate communication device based on receiving an invite to establish a high bitrate communication session and establishing the high bitrate communication session. In this way, the low bitrate communication device may decrease the packet loss rate, reduce a likelihood that the voice call is dropped, and conserve network and/or computing resources by using the low bitrate communication session rather than the high bitrate communication session.

As indicated above, FIG. 1 is provided merely as an example. Other examples are possible and can differ from what was described with regard to FIG. 1. For example, in practice, there may be networks between the devices, additional devices, fewer devices, different devices, or differently arranged devices than those shown in FIG. 1.

Figure 2:
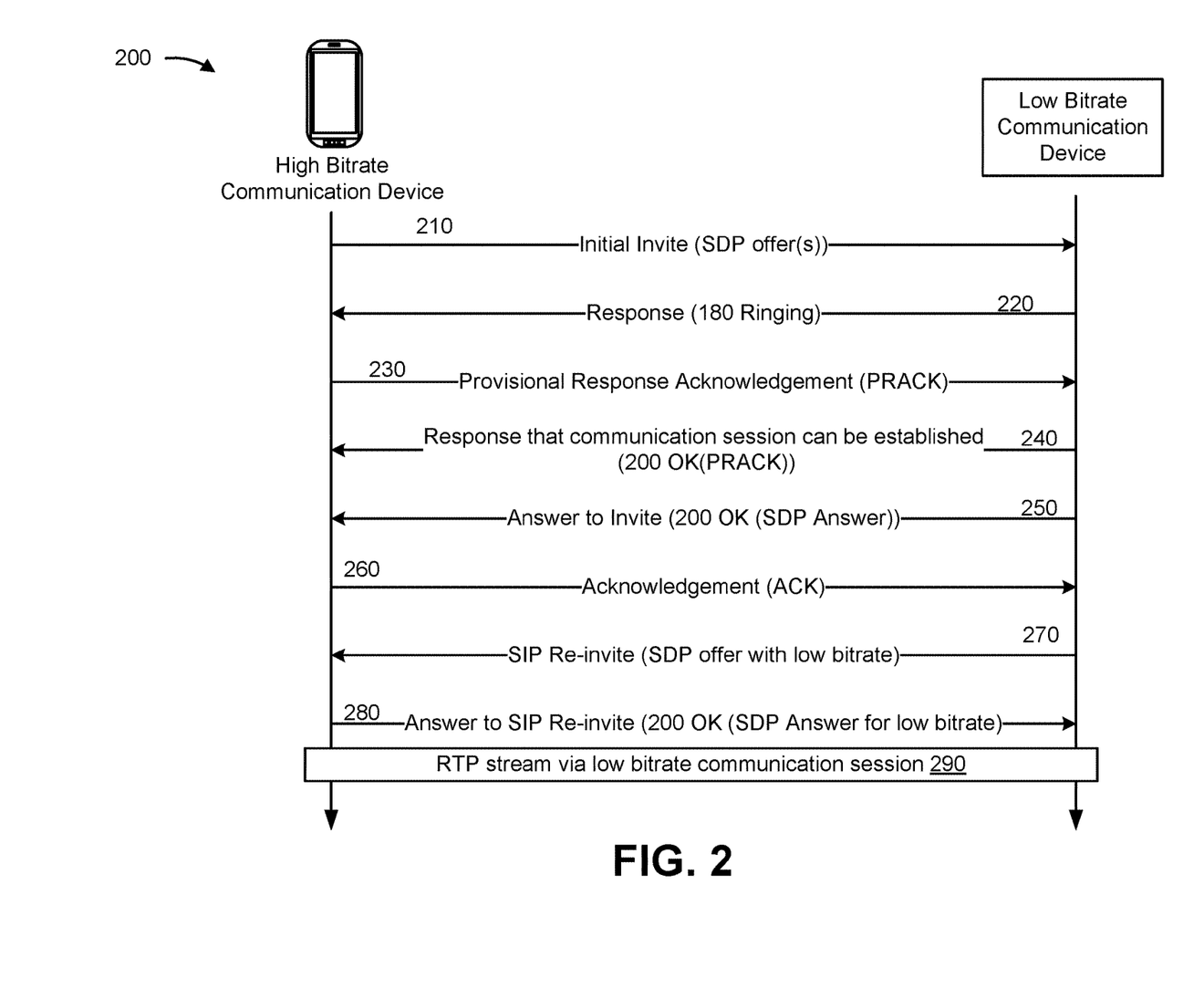
FIG. 2 is a call flow diagram of an example call flow for establishing a low bitrate communication session with a high bitrate communication device.

FIG. 2 is a call flow diagram of an example call flow 200 for establishing a low bitrate communication session with a high bitrate communication device. FIG. 2 shows an example of a low bitrate communication device establishing a low bitrate communication session with a high bitrate communication device that initiated a voice call.

As shown in FIG. 2, and by reference number 210, the high bitrate communication device sends an initial invite to the low bitrate communication device. The initial invite, as shown may include an SDP offer with one or more high bitrate communication protocols. For example, the SDP offer may include an offer to communicate via adaptive multi-rate wideband AMR-WB at 12.65 kbps, via adaptive multi-rate (AMR) at 12.2 kbps, and/or one or more additional offers to communicate via one or more other communication protocols or codecs. In some implementations, the invite may include one or more other characteristics for the communication session (e.g., reliability information (e.g., 100 Rel), timer information, and/or the like).

As further shown in FIG. 2, and by reference number 220, the low bitrate communication device sends a response (e.g., a 180 ringing response) to the high bitrate communication device. The response may indicate that the low bitrate communication device received the invite and can establish a communication session for the voice call. For example, a 180 ringing response may include any tone or indicator (e.g., a ringing sound) to indicate to a user of the high bitrate communication device that the high bitrate communication device is attempting to connect to the low bitrate communication device (or that the low bitrate communication device has been found). Additionally, or alternatively, the response may include or be a 183 session progress response. The 183 session progress response may include an SDP answer to the high bitrate communication protocol offer (e.g., for AMR-WB 12.65 kbps).

As further shown in FIG. 2, and by reference number 230, the high bitrate communication device sends a provisional response acknowledgement (PRACK) back to the low bitrate communication device. The example PRACK may indicate to the low bitrate communication device that a provisional response (e.g., the 180 ringing response) was received by the high bitrate communication device.

As further shown in FIG. 2, and by reference number 240, the low bitrate communication device may respond to the PRACK with a response indicating that the communication session can be established. For example, the low bitrate communication device may respond with a 200 OK response to the PRACK, if the PRACK is acceptable to the low bitrate communication device (e.g., received in a threshold period of time from the 180 ringing response).

As further shown in FIG. 2, and by reference number 250, the low bitrate communication device sends an answer to the invite. For example, as shown, the answer may include a 200 OK response with an SDP answer indicating which communication protocol (or codec) is to be used for the voice call. In some implementations, the low bitrate communication device may select the offer that has the lowest bitrate (e.g., to lessen the packet loss rate, as described above). In such cases, the selected offer may include a low bitrate communication protocol. However, in some cases, offers provided by the high bitrate communication device may not include a low bitrate communication protocol (e.g., only high bitrate communication protocols may be offered). As such, the low bitrate communication device may still select the lowest of the offered communication protocols (e.g., the slowest high bitrate communication protocol) to establish the voice call to avoid any delay in establishing a connection between the high bitrate communication device and the low bitrate communication device. In some implementations, the 200 OK response with the SDP answer may not be sent if the low bitrate communication device provided a 183 session progress message, as described above (e.g., because the 183 session progress message may indicate the SDP answer).

As further shown in FIG. 2, and by reference number 260, the high bitrate communication device may send an acknowledgement (ACK) to indicate that the high bitrate communication session can be established via the high bitrate communication protocol identified in the answer. In some implementations, if the high bitrate communication device can no longer communicate via the high bitrate communication protocol identified in the answer, the high bitrate communication device may send a negative acknowledgement (NACK) to the low bitrate communication device. In such cases, the high bitrate communication session may not be established and/or the low bitrate communication device may send an answer (similar to the answer with reference to reference number 250) with a different high bitrate communication protocol. In some implementations, once the low bitrate communication device receives the acknowledgement from the high bitrate communication session is established.

As further shown in FIG. 2, and by reference number 270, if a high bitrate communication session is established via a selected high bitrate communication protocol, the low bitrate communication device may send an SIP re-invite or an SIP update to the high bitrate communication device. The low bitrate communication device may generate the SIP re-invite or SIP update to include an SDP offer that includes one or more low bitrate communication protocols. For example, the SDP offers may include one or more low bitrate communication protocols, including at least one of an EVS at 5.9 kbps, an EVS at 7.2 kbps, an AMR-WB at 6.6 kbps, or an AMR at 5.9 kbps. In some implementations, the low bitrate communication device may select the one or more communication protocols based on one or more characteristics of the high bitrate communication device and/or the high bitrate communication session (e.g., based on a high bitrate communication protocol used for the high bitrate communication session, based on a type of high bitrate communication device, and/or the like).

Accordingly, the low bitrate communication device may reconfigure (or at least attempt to reconfigure) a high bitrate communication session for the voice call to a low bitrate communication session for the voice call. As described herein, the low bitrate communication protocol may reduce the packet loss rate and/or prevent the likelihood that the call is dropped due to the low bitrate communication device using a high bitrate communication protocol of the high bitrate communication session.

As further shown in FIG. 2, and by reference number 280, the high bitrate communication device sends an answer to the SIP re-invite or SIP update. For example, the answer may include a 200 OK response with an SDP answer that indicates which low bitrate communication protocol is to be used for the voice call within a low bitrate communication session. The answer may correspond to an acceptance to the request from the low bitrate communication device to reconfigure the high bitrate communication session to a low bitrate communication session. As such, the high bitrate communication device may be reconfigured to communicate via a low bitrate communication session to hold the voice call that the high bitrate communication device previously initiated using a high bitrate communication session.

As further shown in FIG. 2, and by reference number 290, an RTP stream is established between the high bitrate communication device and the low bitrate communication device via a low bitrate communication session. In some implementations, the low bitrate communication device and/or high bitrate communication device may perform speech frame bundling of RTP packets to enhance coverage, decrease packet loss, increase voice quality, enhance scheduling efficiency, and/or the like, as described herein.

As indicated above, FIG. 2 is provided merely as an example. Other examples are possible and can differ from what was described with regard to FIG. 2.

Figure 3:
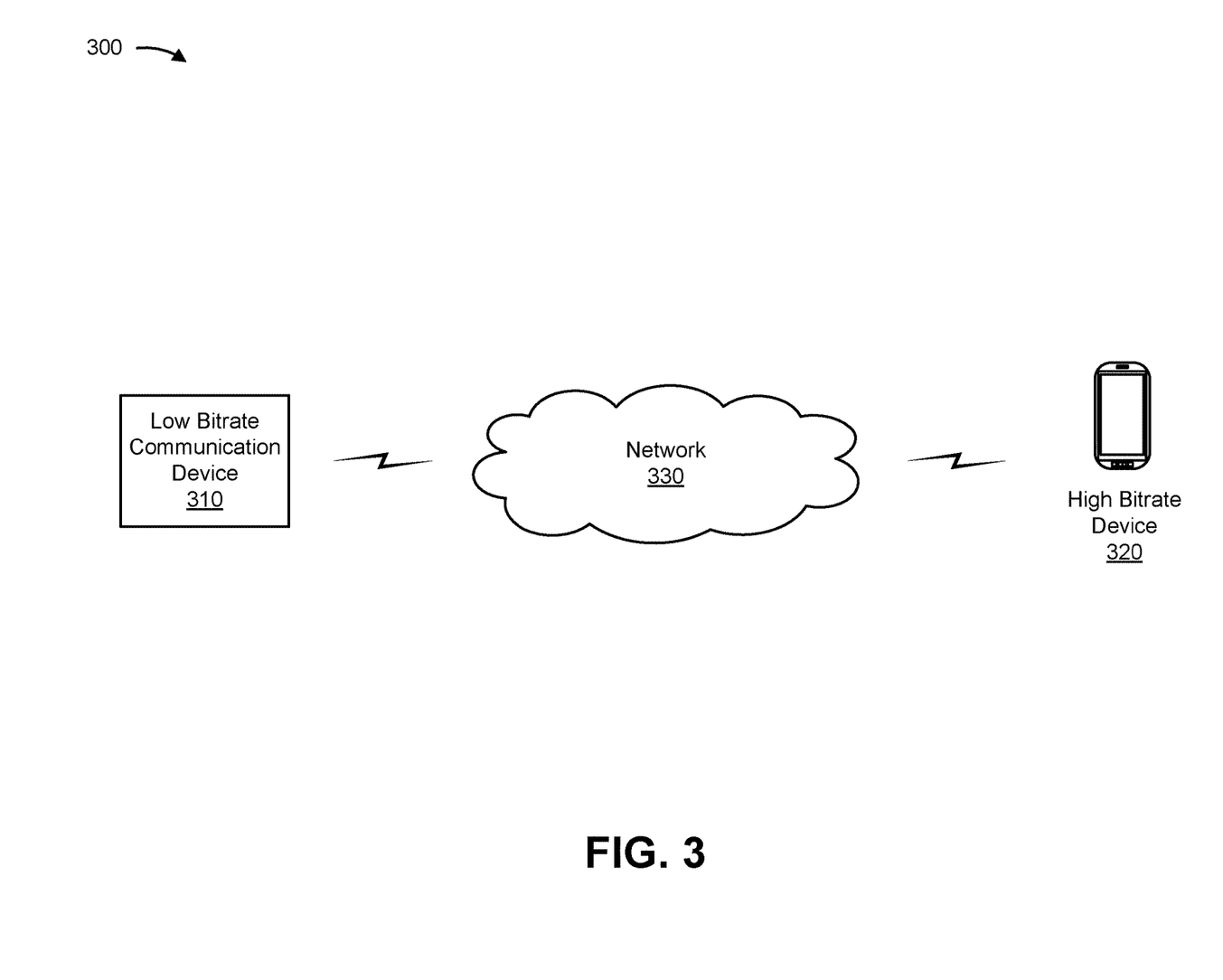
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include a low bitrate communication device 310, a high bitrate communication device 320, and a network 330. Devices of environment 300 may interconnect via wired connections, wireless connections, or a combination of wired and wireless connections.

Low bitrate communication device 310 includes one or more devices capable of receiving, generating, storing, processing, and/or providing information associated with establishing a low bitrate communication session with high bitrate communication device 320. For example, low bitrate communication device 310 may include a wearable communication device (e.g., a smart watch, a fitness tracker, a health monitor, a pair of smart eyeglasses, and/or the like), a smart home device (e.g., a home assistant device, a home monitoring device, and/or the like), an IoT device, and/or a similar type of device. The low bitrate communication device 310 may be capable of supporting a voice call with high bitrate communication device via network 330 (e.g., without the use of a near end high bitrate communication device).

High bitrate communication device 320 includes one or more devices capable of receiving, generating, storing, processing, and/or providing information associated with establishing a low bitrate communication session with low bitrate communication device 310. For example, high bitrate communication device 320 may include a communication and/or computing device, such as a mobile phone (e.g., a smart phone, a radiotelephone, etc.), a laptop computer, a tablet computer, a handheld computer, a landline (or Public Switched Telephone Network (PSTN)) phone, or a similar type of device. High bitrate communication device 320 may be configured (e.g., by default) to communicate at a bitrate of greater than (or faster than) or equal to 12 kbps. According to some implementations, high bitrate communication device can communicate at bitrates less than (or slower than) or equal to 7.5 kbps (e.g., in response to receiving an SIP re-invite from low bitrate communication device 310 with an offer to communicate via a low bitrate communication protocol).

Network 330 includes one or more wired and/or wireless networks. For example, network 330 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the PSTN), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
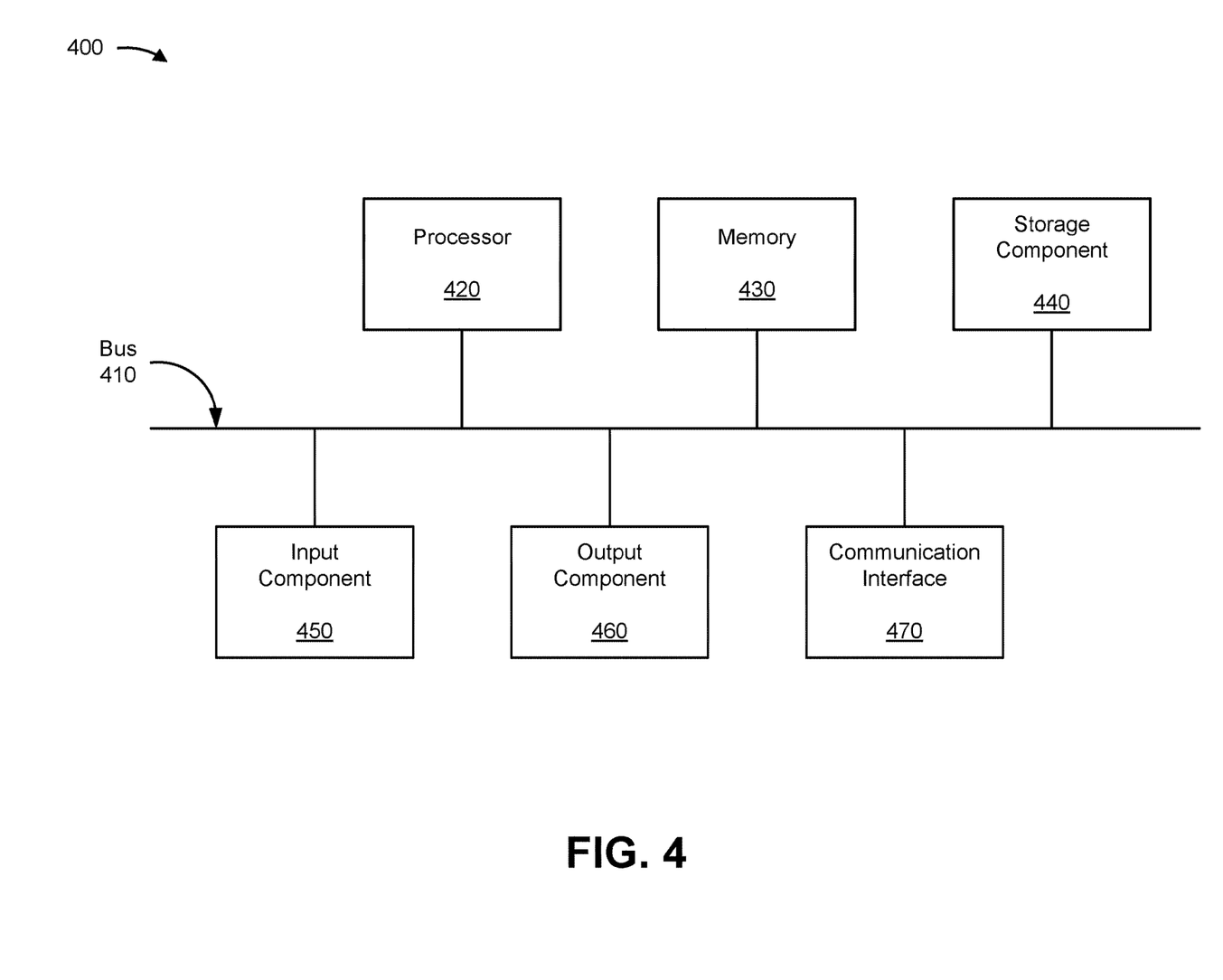
FIG. 4 is a diagram of example components of one or more devices of FIG. 3.

FIG. 4 is a diagram of example components of a device 400. Device 400 may correspond low bitrate communication device 310 and/or high bitrate communication device 320. In some implementations, low bitrate communication device 310 and/or high bitrate communication device 320 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
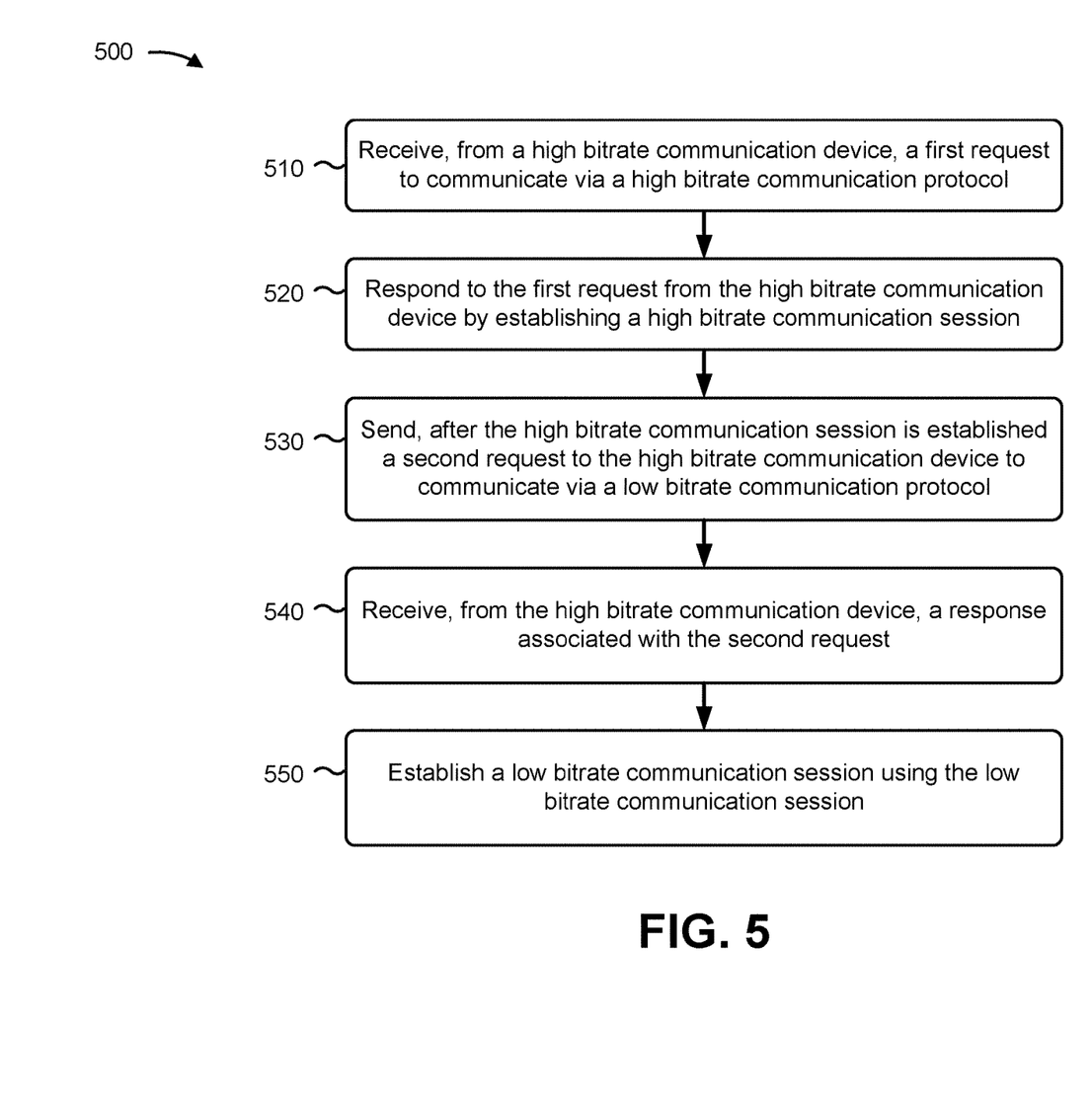
FIG. 5 is a flow chart of an example process for establishing a low bitrate communication session with a high bitrate communication device.

FIG. 5 is a flow chart of an example process 500 for establishing a low bitrate communication session with a high bitrate communication device. In some implementations, one or more process blocks of FIG. 5 may be performed by a low bitrate communication device (e.g. low bitrate communication device 310). In some implementations, one or more process blocks of FIG. 5 may be performed by another device or a group of devices separate from or including the low bitrate communication device, such as a high bitrate communication device (e.g. high bitrate communication device 320).

As shown in FIG. 5, process 500 may include receiving a first request to communicate via a high bitrate communication protocol (block 510). For example, the low bitrate communication device (e.g., using processor 420, memory 430, input component 450, communication interface 470, and/or the like) may receive a first request to communicate via a high bitrate communication protocol, as described above.

In some implementations, the first request is received from a high bitrate communication device. The example first request may be an invite (e.g., an SIP invite) to hold a communication session with the high bitrate communication device. In some implementations, the invite may include one or more SDP offers to communicate via one or more communication session protocols. One or more of the communications session protocols may be a high bitrate communication protocol (e.g., with a bitrate greater than (or faster than) or equal to 12 kbps) and/or one or more of the communication session protocols may be a low bitrate communication protocol (e.g., with a bitrate less than (or slower than) or equal to 7.5 kbps).

In this way, the low bitrate communication device may receive an invite to establish a high bitrate communication session to permit the low bitrate communication device to establish a communication session (e.g., a high bitrate communication session) with the high bitrate communication device and/or hold a voice call with the high bitrate communication device.

As further shown in FIG. 5, process 500 may include communicating with the high bitrate communication device to establish a high bitrate communication session (block 520). For example, the low bitrate communication device (e.g., using processor 420, communication interface 470, and/or the like) may communicate with the high bitrate communication device to establish a high bitrate communication session, as described above.

In some implementations, the low bitrate communication device may establish the high bitrate communication session to exchange voice data (e.g., data associated with the voice call) with the high bitrate communication device. The low bitrate communication device may establish the high bitrate communication session via one or more communications. For example, the low bitrate communication device may send a 180 ringing response, receive a PRACK, send a 200 OK in response to the PRACK, and/or send a 200 OK in response to the initial SIP invite.

In this way, the low bitrate communication device may establish a communication session (though the communication session is a high bitrate communication session) with the high bitrate communication device to avoid delay in connecting with the high bitrate communication device and permit the low bitrate communication device to reconfigure the high bitrate communication session to a low bitrate communication session, as described herein.

As further shown in FIG. 5, process 500 may include, after the high bitrate communication session is established, sending a second request to the high bitrate communication device to communicate via a low bitrate communication protocol (block 530). For example, after the high bitrate communication session is established, the low bitrate communication device (e.g., using processor 420, communication interface 470, and/or the like) may send a second request to the high bitrate communication device to communicate via a low bitrate communication protocol, as described above. In some implementations, the low bitrate communication device may send the second request based on establishing the high bitrate communication session.

In some implementations, the second request may be an SIP re-invite with one or more SDP offers to communicate via a low bitrate communication protocol. For example, the low bitrate communication device may include a plurality of low bitrate communication protocols to communicate with the high bitrate communication device, from which the high bitrate communication device may select the low bitrate communication protocol to establish a low bitrate communication session. In some implementations, to minimize the length of time during which the low bitrate communication device is communicating with the high bitrate communication device via the high bitrate communication session (and thus, minimize the likelihood of a high packet loss rate or likelihood of a dropped communication session), the low bitrate communication device may transmit the SIP re-invite as a next communication after the high bitrate communication session is established (e.g., immediately after an answer to the initial SIP invite).

In this way, the low bitrate communication device may prevent packet loss and/or a likelihood that the high bitrate communication session is dropped by sending a request to reconfigure the high bitrate communication session with the high bitrate communication device to a low bitrate communication session.

As further shown in FIG. 5, process 500 may include receiving a response associated with the second request from the high bitrate communication device, wherein the response establishes a low bitrate communication session using the low bitrate communication protocol (block 540). For example, the low bitrate communication device (e.g., using processor 420, communication interface 470, and/or the like) may receive a response (e.g., an acceptance) associated with the request from the high bitrate communication device, as described above. In some implementations, the response establishes the low bitrate communication session using the low bitrate communication protocol.

In some implementations, the response from the high bitrate communication device may include a selection of one of a plurality of low bitrate communication protocols that was offered in the request to communicate via a low bitrate communication protocol. In such cases, the high bitrate communication device may be configured to select one of the plurality of low bitrate communication protocols to establish the low bitrate communication session based on the SIP re-invite from the low bitrate communication device and/or based on one or more characteristics of the low bitrate communication device.

In this way, the low bitrate communication device may establish a low bitrate communication session with the high bitrate communication device to permit the low bitrate communication device to communicate with the high bitrate communication device at a slower bitrate, thus avoiding packet loss and/or decreasing a likelihood that the high bitrate communication session is dropped.

As further shown in FIG. 5, process 500 may include establishing a low bitrate communication session using the low bitrate communication protocol (block 550). For example, the low bitrate communication device may establish a low bitrate communication session using the low bitrate communication protocol, as described above.

In some implementations, the low bitrate communication device and high bitrate communication device may establish the low bitrate communication session to communicate via the low bitrate communication session using RTP packets (e.g., which establishes an RTP packet stream). For example, the low bitrate communication device may exchange voice data (e.g., via the RTP packets) with the high bitrate communication device over the low bitrate communication session.

In some implementations, the low bitrate communication device may determine whether a voice quality condition (e.g., a packet loss rate, a reference signal received power (RSRP), or a signal to interference plus noise ratio (SINR), and/or the like) associated with a voice call over the low bitrate communication session satisfies a threshold voice quality. In such cases, if the voice quality condition does not satisfy the threshold voice quality, the low bitrate communication device may perform speech frame bundling and/or increase a packet size of real-time transport protocol (RTP) packets for voice data of the voice call. For example, the low bitrate communication device may aggregate multiple vocoder frames into a single RTP packet. In some implementations, the low bitrate communication device (e.g., if the low bitrate communication device is a half-duplexed communication device) may increase the size of the RTP packets to reduce an uplink and/or downlink switching for scheduling efficiency.

In this way, the low bitrate communication device may reconfigure a high bitrate communication session to a low bitrate communication session to decrease a packet loss rate and a likelihood that the high bitrate communication session is dropped, as described herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Accordingly, as described herein, a low bitrate communication device may establish a low bitrate communication session with a high bitrate communication device that originally initiated a high bitrate communication session with the low bitrate communication device. For example, a high bitrate communication session for the voice call can be initiated upon receipt of an invite to hold a voice call, and a communication protocol for holding the call can be reconfigured, by the low bitrate communication device, using a low bitrate communication session to improve a quality of the voice call (e.g., by reducing packet loss and/or likelihood of dropping the voice call) relative to using the high bitrate communication session. Additionally, or alternatively, the low bitrate communication device and/or high bitrate communication device may perform speech frame bundling to improve voice quality of the voice call. Accordingly, as described herein, the low bitrate communication device may conserve network and/or computing resources associated with maintaining a communication session with the high bitrate communication device by decreasing the packet loss rate and the likelihood of a dropped communication session.

The foregoing disclosure provides illustration and description but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   sending, by a low bitrate communication device and within a threshold period of time after establishing a high bitrate communication session with a high bitrate communication device, a request to the high bitrate communication device to communicate via a low bitrate communication protocol;
   receiving, by the low bitrate communication device from the high bitrate communication device, a response associated with the request; and
   establishing, by the low bitrate communication device, a low bitrate communication session using the low bitrate communication protocol.

2. The method of claim 1, further comprising:
   establishing the high bitrate communication session using a high bitrate communication protocol.

3. The method of claim 1, wherein the high bitrate communication device and the low bitrate communication device are in communication with a same cellular network.

4. The method of claim 1, wherein the threshold period of time is less than about 50 milliseconds.

5. The method of claim 1, further comprising:
   determining that a voice quality condition associated with a voice call over the low bitrate communication session does not satisfy a threshold voice quality; and performing speech frame bundling by aggregating multiple vocoder frames into a real-time transport protocol (RTP) packet of the low bitrate communication session to enhance a quality of the voice call.

6. The method of claim 1, where sending the request comprises:
sending the request based on one or more characteristics of the high bitrate communication session,
the one or more characteristics including at least one of:
a type of communication,
whether the high bitrate communication session is for a voice call,
a time of day in which the high bitrate communication session is established, or
whether the high bitrate communication session is experiences a threshold packet loss rate.

7. The method of claim 1, wherein the low bitrate communication device includes:
a smart watch,
a wearable device,
a smart home device,
an internet of things device, or
an enhanced machine type communication device.

8. A low bitrate communication device, comprising:
one or more memories; and
one or more processors, communicatively coupled to the one or more memories, to:
send, within a threshold period of time after establishing a high bitrate communication session with a high bitrate communication device, a request to the high bitrate communication device to communicate via a low bitrate communication protocol;
receive, from the high bitrate communication device, a response associated with the request; and
establish a low bitrate communication session using the low bitrate communication protocol.

9. The low bitrate communication device of claim 8, wherein the one or more processors are further to:
establish the high bitrate communication session using a high bitrate communication protocol.

10. The low bitrate communication device of claim 8, wherein the high bitrate communication device and the low bitrate communication device are in communication with a same cellular network.

11. The low bitrate communication device of claim 8, wherein the threshold period of time is less than about 50 milliseconds.

12. The low bitrate communication device of claim 8, wherein the one or more processors are further to:
determine that a voice quality condition associated with a voice call over the low bitrate communication session does not satisfy a threshold voice quality; and
perform speech frame bundling by aggregating multiple vocoder frames into a real-time transport protocol (RTP) packet of the low bitrate communication session to enhance a quality of the voice call.

13. The low bitrate communication device of claim 8, wherein the one or more processors, when sending the request, are to:
send the request based on one or more characteristics of the high bitrate communication session,
the one or more characteristics including at least one of:
a type of communication,
whether the high bitrate communication session is for a voice call,
a time of day in which the high bitrate communication session is established, or
whether the high bitrate communication session is experiences a threshold packet loss rate.

14. The low bitrate communication device of claim 8, wherein the low bitrate communication device includes:
a smart watch,
a wearable device,
a smart home device,
an internet of things device, or
an enhanced machine type communication device.

15. A non-transitory computer-readable medium storing instructions, the instructions comprising:
one or more instructions that, when executed by one or more processors of a low bitrate communication device, cause the one or more processors to:
send, within a threshold period of time after establishing a high bitrate communication session with a high bitrate communication device, a request to the high bitrate communication device to communicate via a low bitrate communication protocol;
receive, from the high bitrate communication device, a response associated with the request; and
establish a low bitrate communication session using the low bitrate communication protocol.

16. The non-transitory computer-readable medium of claim 15, wherein the one or more instructions, when executed by the one or more processors, further cause the one or more processors to:
establish the high bitrate communication session using a high bitrate communication protocol.

17. The non-transitory computer-readable medium of claim 15, wherein the high bitrate communication device and the low bitrate communication device are in communication with a same cellular network.

18. The non-transitory computer-readable medium of claim 15, wherein the threshold period of time is less than about 50 milliseconds.

19. The non-transitory computer-readable medium of claim 15, wherein the one or more instructions, when executed by the one or more processors, further cause the one or more processors to:
determine that a voice quality condition associated with a voice call over the low bitrate communication session does not satisfy a threshold voice quality; and
perform speech frame bundling by aggregating multiple vocoder frames into a real-time transport protocol (RTP) packet of the low bitrate communication session to enhance a quality of the voice call.

20. The non-transitory computer-readable medium of claim 15, wherein the one or more instructions, that cause the one or more processors to send the request, cause the one or more processors to:
send the request based on one or more characteristics of the high bitrate communication session,
the one or more characteristics including at least one of:
a type of communication,
whether the high bitrate communication session is for a voice call,
a time of day in which the high bitrate communication session is established, or
whether the high bitrate communication session is experiences a threshold packet loss rate.

* * * * *